United States Patent [19]

Ayukawa

[11] 4,066,542
[45] * Jan. 3, 1978

[54] METHOD OF PURIFICATION OF WASTE WATER BY TREATMENT WITH ZIRCONIUM SALT

[75] Inventor: Buichiro Ayukawa, Musahino, Japan

[73] Assignee: Shikoku Paper Mfg. Co., Ltd., Japan

[*] Notice: The portion of the term of this patent subsequent to Dec. 14, 1993, has been disclaimed.

[21] Appl. No.: 712,926

[22] Filed: Aug. 9, 1976

Related U.S. Application Data

[62] Division of Ser. No. 519,866, Nov. 1, 1974, Pat. No. 3,997,439.

[30] Foreign Application Priority Data

Nov. 7, 1973 Japan .................................. 48-125118

[51] Int. Cl.² ........................... C02C 5/04; C02B 1/20
[52] U.S. Cl. ..................................................... 210/51
[58] Field of Search ................. 210/42 R, 4 S, 47, 50, 210/51–53, 55; 169/29, 74

[56] References Cited

U.S. PATENT DOCUMENTS

| | | | |
|---|---|---|---|
| 1,173,698 | 2/1916 | Block | 210/51 |
| 2,204,812 | 6/1940 | Muskat | 210/51 |
| 2,903,335 | 9/1959 | Seaborg et al. | 210/51 |
| 2,917,359 | 12/1959 | Davies | 210/51 |
| 3,730,886 | 5/1976 | Ahrand et al. | 210/38 |
| 3,997,439 | 12/1976 | Ayukawa | 210/50 |

*Primary Examiner*—Thomas G. Wyse
*Attorney, Agent, or Firm*—Bucknam and Archer

[57] ABSTRACT

The present invention refers to a method of purification of waste water from chemical pulping and paper mills comprising coagulate and precipitate suspended substances and colloidal dispersed particles, and precipitation of non-colloidal dissolved, low molecular weight substances in the waste water and form water insoluble precipitates or chelates thereof, and further to a method of purification of waste water of any source by the use of zirconium salt.

2 Claims, No Drawings

METHOD OF PURIFICATION OF WASTE WATER BY TREATMENT WITH ZIRCONIUM SALT

This is a division of application Ser. No. 519,866 filed Nov. 1, 1974, now U.S. Pat. No. 3,997,439.

FIELD OF THE INVENTION

It is well known that the most difficult industrial waste water impurification is a waste water derived from chemical pulping and paper mills which contains large amounts of suspended substances, colloidal dispersed particles, and non-colloidal dissolved low molecular organic substances which are characterized by high oxygen demand, and tendency to form sludge deposits, toxicity, deep color and foam forming tendencies. Waste water from the mills contains cellulose, hemicellulose, pectin, lignin (colored), tannin (colored), extensin (protein) and their degradation product as well as various water soluble colored or colorless low molecular organic and inorganic substances.

All these organic substances in the waste water must be removed completely regardless of control by legislation to obtain ideally purified colorless transparent water which can be reused as processing water or discharged into streams without causing any pollution.

The method of treatment employed for such waste water varies at different mills. A chief difficulty encountered is reduction of the high oxygen demand of this water.

The treatment procedures employed to render the waste water suitable for direct discharge into stream according to the demand of present legislation generally includes removal of the suspended and colloidal dispersed substances by filtration, sedimentation or flotation, when necessary along with the use of coagulants, and biological and/or physical methods for reduction of oxygen demand resulting from dissolved organic substances.

The coagulant used for the removal of the suspended substances and colloidal dispersed particles in the prior art are aluminium sulfate, polyaluminium compounds, ferrous sulfate, calcium hydroxide, sodium silicate and synthetic polymer electrolytes.

DESCRIPTION OF THE PRIOR ART

A partial reduction of oxygen demand and color is effected by the removal of suspended substances and colloidal dispersed particles using the coagulants of the prior art, but a considerable amount of colloidal, dispersed, and non-colloidal dissolved organic substances are remained after filtration. Therefore, the filtrate is commonly treated further by an activated sludge process to reduce the content of organic substances. The procedures are not satisfactory.

Removal of most of the dispersed and dissolved organic substances and color can not be attained without adsorption treatment by active carbon. These adsorption treatment are uneconomical.

The purified, colorless filtrate by the prior art often supports growth of various algae, fungi and bacteria on the residual organic substances.

The method of the present invention employs coagulation and precipitation of suspended substances and colloidal dispersed particles as well as non-colloidal dissolved organic substances to reduce oxygen demand of the waste water, but does not use any one of the coagulants or biological and physical treatment used in the prior art.

There are no references to the use of zirconium salts, as disclosed in the present invention, for the purification of water.

SUMMARY OF THE INVENTION

The present invention relates to a method for purification of waste water in which zirconium salts are used to coagulate and precipitate suspended substances and colloidal dispersed particles as well as non-colloidal dissolved organic and inorganic substances in waste water.

The object of the present invention resides in complete removal of suspended substances and colloidal dispersed particles as wll as complete or partial removal of non-colloidal dissolved low molecular organic substances in the waste water derived from chemical pulping and paper mills so that oxygen demand and color are minimized and transparency is maximized in one process.

The another object of the present invention is to treat paper machine white liquor containing fine fiber, additive, filler, pigment, clay, titanium dioxide and/or dye.

The further another object of the present invention is to treat industrial waste water other than that from pulping and paper mills.

Further, the still further object of the invention is the clarification of surface water to obtain city water.

Further, the still another object of the present invention is to treat sewage containing, among others, foam forming synthetic detergents and phosphates.

PREFERRED DESCRIPTION OF THE INVENTION

Suspended substances defined by Japanese Industrial Standard and colloidal dispersed particles in waste water generally have an electronegative charge (protein is amphoteric so that the sign of the charge depends upon the pH) and zirconium ion in solution exists as an octavalent cationic polymer $[Zr(OH)_2.4H_2O]^{8+}_4$ by hydrolytic polymerization.

Therefore, the zirconium cationic polymer can react electrostatically with the suspended substances and colloidal dispersed particles in waste water to cause complete and rapid coagulation resulting in precipitation.

Many of the non-colloidal, dissolved, low molecular weight organic substances in waste water, such as glucose, which contribute to oxygen demand can not be removed by coagulants presently used. However, they react with zirconium salts to form water insoluble precipitates or chelates and precipitate completely or partially according to the chemical and physicochemical properties thereof.

At the same time, excess zirconium, which is not completely precipitated, can be completely removed since it forms a water insoluble chargeless polymer on adjusting hydrogen ion concentration to pH 4.5–6.8, the pH range being used in the present invention.

Once these coagulates and precipitates are removed by a conventional separating method such as filtration, sedimentation or flotation, colorless nonfoaming, transparent, purified water having little oxygen demand and no toxicity is produced.

The purified water can be reused as processing water or discharged into stream without any biological or physical treatment other than adjusting the pH to 7.0.

Generally speaking, chemical oxygen demand (COD) for waste water is required to be less than 120 ppm prior to disposal by legislation. The completely treated waste water by the method of the present invention shows COD less than 10 ppm.

Therefore, it is emphasized that treatment of water by the method of the present invention not only meets present requirements but also will satisfy anticipated limit of future legislation.

The method of the present invention is effective for treatment of industrial waste water as well as for clarification of surface water.

City water and sewage which contains foam forming synthetic detergents such as alkylbenzene sulfonates, sulfated alcohols, and phosphates can also be treated.

Therefore, the method disclosed in the present invention is a general method for purification of any water which contains suspended substances, colloidal dispersed particles, and non-colloidal dissolved low molecular organic substances.

The zirconium containing precipitates are a by-product of the method disclosed in the present invention. These precipitates can be reused for treatment of water by recovery of zirconium through burning to zirconium dioxide containing ash, chlorination of the oxide to zirconium tetrachloride, and hydrolysis as shown below:

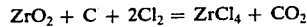

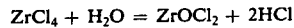

Zirconium is a non-toxic element which is normally considered to be one of rare elements. However, zirconium constitutes about 0.023% of the earth's crust which is about the same as carbon. Therefore, the use of zirconium presents no economical or biological difficulty.

Purification of water by zirconium salts is a novel method which has not been reported.

Suspended substances and colloidal dispersed particles are generally recognized to have an electronegative charge (protein is amphoteric so that the sign of the charge depends upon the pH).

According to Anil K. Mukuherji, Analytical Chemistry of Zirconium and Hafnium (1970), zirconium exists as the polymeric cation $[Zr(OH)_2.4H_2O]^{8+}_4$ through hydrolytic polymerization in solution and not as $Zr^{4+}$ like related metal ions.

Zirconyl ion in zirconyl chloride ($ZrOCl_2.8H_2O$), used in the present invention is in reality a tetramer $[Zr(OH)_2.4H_2O]^{8+}_4$ as established by X-ray diffraction studies on the zirconyl halides and other zirconium salts.

Therefore, the zirconium polymer ion reacts electrostatically with suspended substances and colloidal dispersed particles to cause coagulation and precipitation promptly and completely through colloidal chemical reaction.

The Hardy-Schulze rule in colloid chemistry, which is concerned with the effect of the valence of an ion in the ability to cause coagulation of dispersed particles of opposite sign, shows that actual ratios of the minimum concentration of uni-, di- and trivalent ion required for coagulation are about 600 : 9 : 1 (Samuel Glasstone, The Element of Physical Chemistry, 566, 1946, published by D. Van Nostrand Co.). It should be noted, that octavalent zirconium polymer ion is used in the present invention.

Therefore, the minimum concentration of zirconium salt required for coagulation is extremely low that it is not comparable, with, for example, trivalent aluminium ion in the concentration required in the prior art. The use of zirconium salts can be more economical than aluminium sulfate, despite of the fact that zirconium salts are more expensive than aluminium sulfate. This will prove to be true for the treatment of any type of waste water.

Generally, exygen demand of waste water is appreciably reduced as the result of coagulation and precipitation of suspended and colloidal dispersed substances. However, the effect of non-colloidal dissolved low molecular organic substances on oxygen demand can not be reduced by treating waste water with the coagulants used in the prior art such as aluminium sulfate because such coagulant does not react appreciably with non-colloidal dissolved low molecular organic substances and does not form water insoluble precipitates or chelates.

This is the primary reason why filtrates obtained by coagulation and precipitation of the prior art require further treatment of an activated sludge process and/or active carbon to reduce oxygen demand.

In contrast to the coagulant used in the prior art, the use of zirconium ion, disclosed in the present invention, causes reaction not only both with suspended substances and colloidal dispersed particles but also with a majority of non-colloidal dissolved organic and inorganic substances to rapidly produce water insoluble precipitates or chelates thereof.

Zirconium salts are well known to react with $NH_4OH$, $NaOH$, $(N_2H_4)_2SO_4$, $NH_4NO_2$, $Na_2S_2O_3$, $H_3AsO_3$, $H_3AsO_4$, $H_2SeO_3$, $KIO_3$, $(NH_4)_2HPO_4$, and $H_3PO_3$ to form water insoluble precipitate.

A large number of organic substances have been reported to react with zirconium salts and form water insoluble precipitates.

These can be classified under five categories in the following: (1) organic bases, (2) organic acids and their salts, (3) arsonic acids, (4) phosphonic and phosphinic acids and (5) compounds including sulfonic acids that form water insoluble zirconium chelates.

All these agents are used for gravimetric determination of zirconium and hafnium in analytical chemistry. Clearly many non-colloidal low molecular organic and inorganic substances dissolved in waste water can be precipitated with zirconium to improve oxygen demand, COD or BOD, and toxicity of waste water.

This effect is due to the characteristic chemical properties of zirconium that can not be expected from the coagulants used in the prior art.

The method of the present invention is a general method and can be applied to purification of water of any source containing suspended substances, colloidal dispersed and non-colloidal dissolved substances.

These reactions depend upon the concentration of zirconium and hydrogen ions and actually occur over a wide range of zirconium ion and hydrogen ion concentration. However, the pH must be adjusted to pH 4.5-5.8 to ensure complete precipitation of suspended substances, colloidal particles, and non-colloidal dissolved organic substances even though the concentration of zirconium is sufficient for complete precipitation thereof.

On the other hand precipitation of non-colloidal dissolved low molecular organic substances via water insoluble precipitates or chelates with zirconium depends upon chemical and physicochemical properties of the said organic substances. Therefore, the precipitation of soluble non-colloidal low molecular organic substances with zirconium may be complete or incomplete according to the functional groups of the said organic substances and solubility of formed chelates even when the concentration of zirconium is sufficient and when the hydrogen ion concentration has been adjusted to 4.5–6.8, as shown in the examples. Excess unreacted zirconium salts precipitate completely at pH 4.5–6.8.

Therefore, there is no possibility of secondary pollution induced by the use of zirconium salts as proved by following experiment:

100 ml of a solution of 0.1 M $ZrOCl_2.8H_2O$ was placed in each of fourteen mixing cylinders, increasing quantities of 0.1 N NaOH was added to each cylinder and mixed to precipitate hydroxide of zirconium, and the contents of each cylinder was filtered.

The presence of unprecipitated zirconium in each filtrate was determined by a spot test using alizarin sulfonate (limit of identification : 0.5 microgram Zr) and the pH of each filtrate was measured to find the pH at which unprecipitated zirconium could be detected.

The results obtained are given in the following table.

| No. | 0.1M $ZrOCl_2.8H_2O$ ml | 0.1N NaOH ml | Filtrate pH | Filtrate Reaction of Zr |
|---|---|---|---|---|
| 1 | 100 | 0 | 2.30 | + |
| 2 | 100 | 2 | 2.40 | + |
| 3 | 100 | 4 | 2.59 | + |
| 4 | 100 | 6 | 2.78 | + |
| 5 | 100 | 9 | 3.30 | + |
| 6 | 100 | 10 | 3.52 | + |
| 7 | 100 | 11 | 4.11 | + |
| 8 | 100 | 11.2 | 4.12 | + |
| 9 | 100 | 11.5 | 4.30 | + |
| 10 | 100 | 11.8 | 4.47 | + |
| 11 | 100 | 12.0 | 4.62 | − |
| 12 | 100 | 12.3 | 4.81 | − |
| 13 | 100 | 12.5 | 5.10 | − |
| 14 | 100 | 12.8 | 5.50 | − |

The experiment above shows that zirconium salts do not remain dissolved in an aqueous solution at a pH higher than 4.50.

For this reason any excess zirconium in water treated by the method of the present invention at pH 4.5–6.8 will be precipitated.

Precipitation of non-colloidal dissolved inorganic substances which can react with zirconium salts to form water insoluble precipitates is complete as mentioned above.

It is well known that zirconium ions react with phosphate in acidic medium and form water insoluble zirconium phosphate. The reacton is used for gravimetric determination of zirconium and is the basic of a separation method for removing zirconium from Fe, Al and Ti.

Therefore, zirconium salts are the only substances which can remove dissolved phosphate completely from effluents or sewage and thereby prevent pollution such as red tide, namely the large scale growth of a red colored plankton feeding on phosphate and ammonium existing in large amount in sea water.

The red tide gives a great damage to the cultivation industry of pearl, oyster and purple laver (seaweed). As already mentioned, toxic arsenious and arsenous acids react with zirconium and form water insoluble compounds. Therefore, these toxic substances often found in mine waste water can be removed completely by zirconium.

While zirconium is considered to be an element in the class of rare elements, it is wide spread in nature and consists about 0.023% of the earth's crust, about the same occurrence as carbon but higher than that of nickel, copper, zinc, lead or some other familiar metals.

The most important zirconium ores are baddeleyite ($ZrO_2$) and zircon ($ZrSiO_4$). The largest present sources are beach sand in Australia, India and Brazil. Commercial quantities are present in the U.S.A. also.

Purification of titanium containing minerals such as rutile and ilmenite provides a large amount of zirconium dioxide as a by-product. Therefore, the use of zirconium as a reagent for coagulating and precipitating contaminants from water encounters no foreseeable economic difficulty.

Hafnium is always associated with zirconium and usually consists of 1–3% of the total zirconium present. The zirconium salts used in the present invention, therefore, may contain hafnium. Chemical behavior of hafnium in an aqueous solution is similar to zirconium. Thus it is not necessary to separate hafnium from zirconium in the present application.

The next question is the toxicity of zirconium since the use of zirconium as disclosed in the present invention represents the first use of zirconium for treatment of waste water to be returned to the environment.

According to Warren B. Blumental, Journal of Chemical Education, Page 67, volume 39, number 12, December 1962, zirconium is non-toxic under ordinary condition of ingestion or contact. No case of zirconium poisoning has ever been reported from the industrial handling of zirconium compounds.

In commenting on pharmaceutical application of zirconium compounds, it should be emphasized that zirconium is a non-toxic element. Moreover, there is an experiment indicating that food mixed with zirconium citrate and given to dogs had no effect on the health of the animals (C. Rechet, Gardner, Goodbody, C. r. 181, 1925, 1105/6).

On the other hand, the method of the present invention employs the zirconium at pH 4.5–6.8 and cause to form water insoluble precipitates. Filtrates from these solutions do not contain any detectable zirconium. It should be emphasized that there is little possibility that detectable amounts of zirconium would be present in the filtrate.

Any water soluble zirconium salt can be used in the method of the present invention (for instance, chloride, nitrate, sulfate, acetate or zirconyl salts thereof), but zirconyl chloride or zirconium oxychloride $ZrOCl_2.8H_2O$ is most convenient and economical one.

All chlorine in zirconyl chloride is appeared as $Cl^-$ in water after treatment of the present invention. Therefore, the concentration of $Cl^-$ in the filtrate obtained after treatment by the present invention increases also according to the quantities when zirconium oxychloride used.

The coagulates and precipitates containing zirconium are obtained in the method disclosed in the present invention as by-products from which zirconium is recovered as zirconium oxychloride by chlorination of ash containing zirconium dioxide.

$$ZrO_2 + C + 2Cl_2 = ZrCl_4 + CO_2$$

$$ZrCl_4 + H_2O = ZrOCl_2 + 2HCl$$

$$ZrOCl_2 + 8H_2O = ZrOCl_2 \cdot 8H_2O$$

The chlorination reaction of zirconium dioxide is a well known method of manufacturing zirconium chloride in the prior art, so that the reuse of the by-product makes the method of the present invention remarkably economical.

The treatment of effluents by the method disclosed in the present invention can be carried out independently, or in combination with other known methods of the prior at when necessary or deemed advantageous.

The general procedure of the treatment by the method disclosed in the present invention is conducted as follows: Sufficient quantity of an aqueous solution of zirconyl chloride to complete precipitation of suspended, colloidal and non-colloidal dissolved substances is added to effluents of any water sources to be treated, and the pH is adjusted to 4.5–6.8 by adding acid or base thereto. Then the effluent is thoroughly mixed and complete coagulation and precipitation of suspended substances and colloidal dispersed particles occurs.

Complete or partial precipitation of non-colloidal dissolved substances and complete precipitation of not reacted zirconium also occurs rapidly. The coagulates and precipitates are removed by a known separation methods in the prior arts such as filtration, sedimentation or flotation to produce colorless transparent filtrates having little oxygen demand and no toxicity. The filtrate is tested the presence of unreacted zirconium by alizarin sulfonate according to F. Feigl and V. Anger, Spot Test in Inorganic Analysis, 1972 (limit of detection : 0.5 microgram Zr). Zirconium has never been detected in the filtrates as shown in the examples.

Chemical oxygen demand (COD) of the effluent to be treated and that of the filtrate is measured in an expressed of COD ppm according to the test method for waste water of JIS (Japanese Industrial Standard) K 0102, 1971 to prove reduction of oxygen demand.

It is well known that color of the waste water from kraft or sulfite pulping mills is brown mainly due to lignin.

Complete removal thereof is impossible with coagulants used in the prior art or by treatment with active carbon. Therefore, the color of waste water from the mills has not been controlled by legislation since a commercially feasible method for removal thereof is unavailable. This is a problem which must be immediately solved since the color of effluents will be controlled by legislation in the near future.

In the prior art, colored waste water is treated with coagulants, other than zirconium as disclosed in the present invention, to remove suspended substances and colloidal dispersed particles. The removal of them by prior art is incomplete. Oxygen demand and color are appreciably improved by partial removal as mentioned above.

There is no coagulant in the prior art which is able to remove non-colloidal dissolved low molecular organic substances from the waste water to improve color and oxygen demand. Therefore, activated sludge process and/or adsorption by active carbon must be carried out subsequently to remove non-colloidal dissolved low molecular organic substances.

In contrast to the above, the present invention produces colorless transparent water having little oxygen demand and no toxicity with ease by a single process. The treated water can be reused as processing water or is sufficiently pure to be discharged into streams under current and foreseen legislative standards without pollution after adjusting the pH to 7.0.

In the purification of paper machine white liquor it is well known that among others, removal of titanium dioxide is most difficult. Titanium dioxide is characterized by forming very stable suspension and cannot be removed completely from the white water by the methods of the prior art. According to the method of the present invention, titanium dioxide can be coagulated and precipitated completely and rapidly together with fine fiber and other materials to produce colorless, transparent water which can be reused or discharged into streams after adjusting the pH to 7.0. Dyes also can be removed directly or indirectly with zirconium salts by the method of the present invention due to their chemical constitution to produce colorless, transparent water as shown in the example.

Since it is almost impossible to examine all these effluents of industrial waste water, the effluent from aluminium polishing mill was selected among them as typical and colorless, transparent water resulted as shown in the example.

In addition to the above waste water containing gelatine, casein, hemoglobin, sugar, sugar acid, sugar alcohol and clay can be purified by the described zirconium treatment as the examples show.

Surface water is commonly clarified by aluminium sulfate. Zirconium salts to obtain city water can be used in place of aluminium sulfate to clarify surface water. The capacity of the zirconium salt for clarifying water is markedly larger than that of aluminium sulfate. Zirconium ions in solution is an octavalent polymer cation that react with colloidal, dispersed, and non-colloidal dissolved low molecular substances to cause precipitation with them, while trivalent aluminium ions do not react with non-colloidal dissolved low molecular substances to cause precipitation.

As already mentioned, phosphate reacts with zirconium salts to form water insoluble zirconium phosphate. The synthetic detergents, alkylbenzene sulfonates and sulfated alcohols, react with zirconium to form water insoluble precipitates.

At the same time foams of waste water are broken rapidly by the present invention. To date, there is no method in the prior art for precipitating synthetic detergents in sewage and for breaking foams formed thereby. Therefore, it should be emphasized that the use of zirconium as disclosed in the present invention is unique and very advantageous in the removal of synthetic detergents from sewage.

EXAMPLE 1.

Waste water (200 ml) composed of diluted black liquor from kraft pulping mill (pH 7.83, COD 217.5 ppm) was placed in a mixing cylinder, and 5.6 ml of 0.1 N NaOH was added and mixed. Addition of 6 ml of 0.1 M $ZrOCl_2 \cdot 8H_2O$ to the cylinder with thoroughly mixing resulted in prompt coagulation and precipitation to produce a colorless, transparent water after filtration.

Hydrogen ion concentration and chemical oxygen demand of the filtrate were measured (pH 6.29, COD 15.36 ppm).

One drop of the filtrate was mixed in a micro crucible with one drop of a 1% alcoholic solution of sodium alizarin sulfonate and boiled. One drop of 1 N HCl was added. The red to violet color which indicates the presence of Zr did not appear (limit of identification : 0.5 microgram Zr).

The clarified water (100 ml) was mixed with 20 ml of 0.1 N $AgNO_3$ (about three times excess for $Cl^-$ contained in the filtrate) and the precipitated AgCl was removed by filtration. The resulting solution was concentrated about to 10 ml at 30° C in vacuo. Concentrated ammonia was added and the resulting solution was stored in the dark over night. The silver complex was reduced to metallic silver. The reaction indicates that aldehydes, formed by degradation of cellulose, hemicellulose and pectin in wood during the drastic chemical pulping process, were present in the solution. These low molecular weight, non-colloidal, soluble aldehydes contribute to the oxygen demand and cannot be removed by coagulants, such as aluminium sulfate or calcium hydroxide, used in the prior art.

The original filtrate (100 ml) was placed in a mixing cylinder, 2 ml of chlorine water (57.67 mg $CL_2$/20 ml) was added, and the mixture was irradiated for thirty minutes with an ultra violet light (SHL-100 UV lamp, Tokyo Shibaura Electric Co. Ltd.).

Absence of residual chlorine was confirmed with 4,4'-bis-(dimethylamino)-thiobenzophenone (thio-Michler's ketone). The deep blue color which indicates the presence of chlorine did not appear (limit of detection : 0.1 microgram $Cl_2$).

Solution of 5.2 ml of 0.1 N NaOH and 2 ml of 0.1 M $ZrOCl_2.8H_2O$ were mixed with 100 ml of the chlorine free filtrate, and the resulting precipitate was removed by filtration. Hydrogen ion concentration and chemical oxygen demand of the filtrate were measured (pH 6.58, COD 1.39 ppm). This example clearly shows the fact that suspended substances defined by JIS (Japanese Industrial Standard) and colloidal dispersed particles in the waste water from the kraft pulping mill were coagulated and precipitated completely by zirconium ion whereas noncolloidal, dissolved, low molecular weight organic substances, such as glucose or aldose, cannot be removed completely.

The fact that non-colloidal, dissolved, low molecular weight aldehydic compounds can be removed completely after oxidation indicates the formation of carboxyl groups (—COOH) from the primary hydroxyl or aldehyde groups and/or ketone groups from secondary hydoxyl groups of aldose on oxidation. The carboxyl and ketone groups are more amenable than the hydroxyl groups to formation of water insoluble chelates with zirconium which can readily be removed by filtration. The following experiments carried out on glucose, gluconate, fructose and uronic acids support the conclusion that carboxyl and ketone groups are more favorable than hydroxyl groups to the formation of water insoluble chelates of sugars and their derivatives with zirconium.

EXAMPLE 2

To 100 ml of 0.01% aqueous glucose (pH 5.6, COD 62.29 ppm), a component of the non-colloidal, dissolved substances in waste water from chemical pulping mills, was added 17 ml of 0.1 N NaOH with mixing. Then 10 ml of 0.1 M $ZrOCl_2.8H_2O$ was added and mixed thoroughly. Precipitation occurred promptly to produce a colorless, transparent supernatant which is isolated by filtration.

The filtrate (pH 5.45, COD 26.67 ppm) contained no detectable zirconium ion by alizarin sulfonate test.

The experiment was carried out to prove reduction of oxygen demand due to dissolved aldose in waste water from chemical pulping mills through the use of zirconium salts.

Glucose, a typical aldose, can be precipitated by chelate formation with zirconium ion. Presumably, all aldoses can form chelates with zirconium ion and thus be precipitated but not removed completely.

EXAMPLE 3

To 100 ml of 0.01% aqueous D-xylose (pH 5.1, COD 60.96 ppm), a component of the non-colloidal, dissolved substances in waste water from chemical pulping mills, was added 10.2 ml of 0.1 N NaOH with mixing.

Addition of 6 ml of 0.1 M $ZrOCl_2.8H_2O$ with thorough mixing resulted in prompt precipitation to produce a colorless, transparent supernatant which was isolated by filtration. The filtrate pH 5.55, COD 13.4 ppm) contained no detectable zirconium ion by alizarin sulfonate test.

The result shows that xylose, an aldopentose, can be precipitated by forming a chelate with zirconium ion, but the removal is not complete as was the case with glucose.

EXAMPLE 4

To 100 ml of 0.01% aqueous D-arabinose (pH 5.2, COD 66.1 ppm) was added 10 ml of 0.1 N NaOH with mixing.

Addition of 6 ml of 0.1 M $ZrOCl_2.8H_2O$ with thorough mixing resulted in rapid precipitation to form a colorless, transparent supernatant which was isolated by filtration. The filtrate (pH 5.53, COD 17.52 ppm) was not detected zirconium ion in the test of alizarin sulfonate test.

The result shows that the aldopentose arabinose, a degradation product of hemicellulose dissolved in waste water from chemical pulping mills, can be removed by zirconium ion but not completely.

EXAMPLE 5

To 100 ml of 0.01% aqueous fructose (pH 5.2, COD 34.15 ppm) was added 10.2 ml of 0.1 N NaOH with mixing.

Addition of 6 ml of 0.1 M $ZrOCl_2.8H_2O$ with thorough mixing resulted in rapid precipitation to form a colorless, transparent supernatant which was isolated by filtration. The filtrate (pH 5.5, COD 7.12 ppm) was not detected zirconium ion in the test of alizarin sulfonate test.

The result shows that the ketonic group of monosaccharide is more favorable than an aldehydic group in formation of water insoluble chelates with zirconium ion.

EXAMPLE 6

To 100 ml of 0.01% aqueous sodium gluconate (pH 5.43, COD 56.0 ppm) was added 3.4 ml of 0.1 N NaOH with mixing. Addition of 2 ml of 0.1 M $ZrOCl_2.8H_2O$ with thorough mixing resulted in rapid precipitation to form a colorless, transparent supernatant which was isolated by filtration. The filtrate (pH 5.62, COD 1.14 ppm) contained no detectable zirconium ion by means of alizarin sulfonate.

The result obtained in above shows that sugar acid formed by oxidation of the aldehydic carbon atom of aldose to a carboxylic acid group, can be completely removed and suggests that aldoses contained as noncolloidal, dissolved organic substances in waste water from chemical pulping mills can be removed completely by zirconium salts after oxidation, for example, by chlorine or aeration of the waste water to render COD value zero within experimental error.

EXAMPLE 7

To 1.0 ml of 0.01% aqueous glucose (pH 5.2, COD 64.17 ppm) was added 3 ml of 0.1 N NaOH (pH 8.95, COD 64.0 ppm). The alkaline glucose solution was aerated for four hours to oxidize the glucose contained. To 100 ml of the oxidized solution was added 18.8 ml of 0.1 N NaOH under mixing.

Addition of 10 ml of 0.1 M $ZrOCl_2.8H_2O$ with thorough mixing resulted in rapid precipitation and formed a colorless, transparent supernatant which was isolated by filtration. The filtrate (pH 5.8, COD 7.54 PPm) was not detected zirconium ion in the test of alizarin sulfonate.

The example shows that glucose contained in the waste water from chemical pulping mills can be removed almost completely after oxidation by aeration or oxidation by chlorine (example 1) and suggests that every aldose contained as non-colloidal, dissolved substances in the waste water can be removed almost completely after oxidation.

EXAMPLE 8

To 100 ml of 0.01% aqueous D-glucuronic acid which is formed by oxidation of the carbon atom bearing primary hydroxylic group of glucose to carboxylic group (pH 3.71, COD 60.67 ppm) was added 7.9 ml of 0.1 N NaOH with mixing.

Addition of 4 ml of 0.1 M $ZrOCl_2.8H_2O$ with thorough mixing resulted in rapid precipitation to produce a colorless, transparent supernatant which was isolated by filtration. The filtrate (pH 5.6, COD 3.59 ppm) was not detected zirconium ion in the test of alizarin sulfonate.

The result shows that glucuronic acid, a typical uronic acid in waste water from chemical pulping mills, can be removed completely, within experimental error, by zirconium ion. The carboxylic group of uronic acid is more favorable than a primary hydroxylic group in formation of water insoluble chelate with zirconium ion.

Presumably galacurinic and mannuronic acid, degradation products of hemicellulose and pectin, can be removed completely as well.

EXAMPLE 9

To 100 ml of 0.01% aqueous galacturonic acid (pH 3.37, COD 51.56 ppm) was added 10 ml of 0.1 N NaOH with mixing. Addition of 6 ml of 0.1 M $ZrOCl_2.8H_2O$ with thorough mixing resulted in rapid precipitation to produce a colorless, transparent supernatant which was isolated by filtration. The filtrate (pH 5.55, COD 3.41 ppm) was not detected zirconium ion in the test of alizarin sulfonate.

The result above shows that galacturonic acid in waste water from chemical pulping mills which is contained as a non-colloidal, dissolved, low molecular weight degradation product of hemicellulose and pectin, can be removed completely within experimental error.

EXAMPLE 10

To 100 ml of 0.01% aqueous mannitol (pH 5.2, COD 73.18 ppm) was added 10 ml of 0.01 N NaOH with mixing. Addition of 6 ml of 0.1 M $ZrOCl_2.8H_2O$ with thorough mixing resulted in rapid precipitation to produce a colorless, transparent supernatant which was isolated by filtration. The filtrate (pH 5.75, COD 0.38 ppm) contained no detectable zirconium ion by alizarin sulfonate.

The result above shows that the sugar alcohol, mannitol, formed by reduction of mannose, can be removed completely by zirconium ion and suggest that other sugar alcohols, such as sorbitol which is formed by reduction of glucose, can be removed by zirconium ion completely as well.

EXAMPLE 11

To 100 ml of 0.01% aqueous solution of raw sugar (pH 5.2, COD 70.38 ppm) was added 10 ml of 0.1 N NaOH with mixing. Addition of 6 ml of 0.1 M $ZrOCl_2.8H_2O$ with thorough mixing resulted in rapid precipitation and produced a colorless, transparent supernatant which was isolated by filtration. The filtrate (pH 5.5, COD 55.36 ppm) was not detected zirconium ion in the test of alizarin sulfonate.

In place of raw sugar, 100 ml of 0.01% aqueous saccharose (pH 5.1, COD 79.81 ppm) was used, and the same experiment was carried out.

The filtrate obtained showed pH 5.5, COD 50.15 ppm and zirconium was not detected by alizarin sulfonate.

The result shows that raw sugar and saccharose can be precipitated partially and suggest that disaccharides can be removed completely after oxidation through hydrolysis as shown in example 1.

EXAMPLE 12

To 100 ml of 0.01% aqueous lactose (pH 5.15, COD 71.46 ppm) was added 10 ml of 0.1 N NaOH with mixing. Addition of 6 ml of 0.1 M $ZrOCl_2.8H_2O$ with thorough mixing resulted in rapid precipitation and produced a colorless, transparent supernatant which was isolated by filtration. The filtrate (pH 5.52, COD 26.16 ppm) was not detected zirconium ion in the test of alizarin sulfate.

This result shows that a disaccharide, lactose, can be removed completely after oxidation through hydrolysis since lactose is composed of one molecule of glucose and one molecule of galactose.

EXAMPLE 13

To 400 ml of waste water from kraft pulping mill composed of diluted black liquor (pH 7.72, COD 128.69 ppm) was added lime milk to adjust the hydrogen ion concentration to pH 12.1 to coagulate and precipitate suspended substances and colloidal dispersed particles.

Carbon dioxide was passed through the filtrated solution to remove excess calcium ions as insoluble calcium carbonate and filtered again (pH 7.18, COD 22.51 ppm).

To 100 ml of the filtrate was added 2 ml of chlorine water (80.07 mg $Cl_2$/20 ml) and the resulting solution was irradiated for 30 minutes with ultra violet light as in example 1 to oxidize non-colloidal dissolved substances.

To 102 ml of the oxidized solution (pH 7.03, COD 12.89 ppm) was added 0.8 ml of 0.1 N NaOH with mixing. Addition of 2 ml of 0.1 M $ZrOCl_2.8H_2O$ with thorough mixing resulted in rapid precipitation to produce a colorless, transparent supernatant, which was isolated by filtration (pH 7.03, COD 8.59 ppm).

The result shows that the COD value obtained in this example is far larger than that of example 1 and that coagulation and precipitation of colloidal dispersed particles of the waste water by coagulants used in the prior art, such as calcium hydroxide, is not complete.

EXAMPLE 14

To 100 ml of 0.01% aqueous D-xylan, a main component of hemicellulose contained in waste water from chemical pulping mills (pH 5.4, COD 76.63 ppm) was added 3.5 ml of 0.1 N NaOH with mixing.

Addition of 2 ml of a solution of 0.1 M $ZrOCl_2.8H_2O$ with thorough mixing resulted in rapid coagulation and precipitation to produce a colorless, transparent supernatant which was isolated by filtration.

The filtrate (pH 5.63, COD 3.22 ppm) was not detected zirconium ion in the test of alizarin sulfonate.

The result shows that xylan can be removed completely by zirconium ions.

EXAMPLE 15

To 100 ml of 0.01% aqueous sodium lignin sulfonate (pH 6.55, COD 89.12 ppm) was added 4.8 ml of 0.01 N NaOH with mixing. Addition of 4.0 ml of 0.01 M $ZrOCl_2.8H_2O$ with thorough mixing resulted in rapid coagulation and precipitation to produce a colorless, transparent supernatant which was isolated by filtration. The filtrate (pH 5.45, COD 4.92 ppm) contained no detectable zirconium ion by alizarin sulfonate.

It is clear from this result that lignin sulfonate, a primary colored component of waste water from sulfite pulping mills, cannot be removed completely by precipitants used in the prior art, such as aluminium sulfate or calcium hydroxide, but can be removed completely by zirconium ions.

EXAMPLE 16

To 100 ml of waste water from sulfite pulping mill which is composed of diluted sulfite cooking liquor (pH 3.5, COD 501 ppm) was added 5 ml of 0.01 N NaOH with mixing. Addition of 0.01 M $ZrOCl_2$ with thorough mixing resulted in rapid coagulation and precipitation to produce a colorless, transparent supernatant which was isolated by filtration. The filtrate (pH 5.35, COD 157.5 ppm) contained no detectable zirconium ion by alizarin sulfonate.

The residual COD is due mainly to non-colloidal, dissolved low molecular weight organic substances since colloidal lignin sulfonate can be removed completely by zirconium ion as example 15 shows.

Clearly the residual COD could be further reduced by zirconium ions after oxidation as shown in example 1.

Removal after oxidation was not examined since sulfite pulping has almost ceased today because of its low yield and air pollution due to sulphur dioxide.

EXAMPLE 17

To 100 ml of 0.001% aqueous direct sky blue 5B (pH 5.4, deep blue colored) was added 0.72 ml of 0.01 N NaOH with mixing.

Addition of 0.4 ml of 0.01 M $ZrOCl_2.8H_2O$ with thorough mixing resulted in rapid precipitation to produce a colorless, transparent supernatant which was isolated by filtration. The filtrate (pH 5.5) contained no detectable zirconium ion by alizarin sulfonate.

This is a typical sulfonic acid group ($-SO_3H$) bearing dye commonly used as an acidic dye in the manufacture of paper. The fact that sulfonic acids and their salts can form water insoluble chelates which precipitate completely has already been mentioned.

EXAMPLE 18

To 100 ml of 0.001% aqueous astrazon blue G (pH 5.2, deep blue colored), one of the typical basic dye used in paper making, was added 1.0 ml of a solution of 0.1% calcium hypochlorite (4.1 mg $Cl_2$/50 ml) with mixing. No dicolorization of the dye was not observed.

Addition of 1.0 ml of 0.01 N NaOH and 1.0 ml or 0.01 M $ZrOCl_2.8H_2O$ with thorough mixing resulted in rapid precipitation to produce a colorless, transparent supernatant which was isolated by filtration.

The filtrate (pH 5.9) was not detected zirconium ion in the test of alizarin sulfonate.

Hypochlorite ion in the filtrate was tested by safranin O (limit of identification : 0.5 microgram $OCl^-$) and could not be detected.

In the example, 4.0 ml of the solution of 0.1% calcium hypochlorite was used. When residual hypochlorite was detected in the filtrate after treatment with zirconium ions, 5 g of iron scrap were added to the hypochlorite containing filtrate.

The iron scrap was removed by filtration after thirty minutes, and $OCl^-$ was no longer detectable.

The complete removal of hypochlorite was accomplished by ferrous hydroxide on the surface of the iron scrap as shown in the following reaction:

$$2Fe(OH)_2 + OCl^- + H_2O = Cl^- + 2Fe(OH)_3$$

Therefore, no commercial difficulty exists in removing residual hypochlorite ion.

EXAMPLE 19

To 100 ml of 0.01% aqueous potato starch (pH 5.7, COD 29.14 ppm) was added 10.5 ml of 0.1 N NaOH with mixing. Addition of 6.0 ml of 0.1 M $ZrOCl_2.8H_2$) with thorough mixing resulted in rapid coagulation and precipitation to produce a colorless, transparent supernatant which was isolated by filtration.

The filtrate (pH 5.7, COD 2.86 ppm) was not detected zirconium ions in the test of alizarin sulfonate and no starch by reaction with iodine.

The experiment shows complete removal of starch by zirconium ions.

EXAMPLE 20

To 100 ml of 0.01% aqueous sodium carboxymethyl cellulose (CMC) (pH 5.4, COD 58.64 ppm) was added 9.6 ml of 0.1 N NaOH with mixing.

Addition of 6 ml of 0.1 M $ZrOCl_2.8H_2O$ with thorough mixing resulted in rapid coagulation and precipitation to produce a colorless, transparent supernatant which was isolated by filtration.

The filtrate (pH 5.5, COD 3.05 ppm) was not detected zirconium ion in the test of alizarin sulfonate.

Clearly, complete removal of CMC can be attained by zirconium ions as shown above.

EXAMPLE 21

To 100 ml of 0.01% aqueous pectin (pH 4.45, COD 57.14 ppm) was added 10 ml of 0.1 N NaOH with mixing. Addition of 0.1 M $ZrOCl_2.8H_2O$ with thorough mixing resulted in rapid coagulation and precipitation to produce a colorless, transparent supernatant which was isolated by filtration. The filtrate (pH 5.6, COD 4.57 ppm) was not detected zirconium ion in the test of alizarin sulfonate.

The result shows that pectin, a component of colloidal, dissolved substances in both waste water from chemical pulping mills and effluent from food industry, can be removed completely by zirconium ions.

EXAMPLE 22

To 100 ml of 0.1% aqueous gelatine (pH 6.2, COD 45.71 ppm) was added 17 ml of 0.1 N NaOH with mixing.

Addition of 10 ml of 0.1 M $ZrOCl_2.8H_2O$ with thorough mixing resulted in rapid coagulation and precipitation to produce a colorless, transparent supernatant which was isolated by filtration.

The filtrate (pH 5.4, COD 9.75 ppm) was not detected zirconium ion in the test of alizarin sulfonate.

EXAMPLE 23

To 100 ml of aqueous casein sodium (pH 5.5, COD 64.15 ppm) was added 10 ml of 0.1 N NaOH with mixing.

Addition of 6 ml of 0.1 M $ZrOCl_2.8H_2O$ with thorough mixing resulted in rapid coagulation and precipitation to produce a colorless, transparent supernatant which was isolated by filtration.

The filtrate (pH 5.7, COD 1.51 ppm) was not detected zirconium in the test of alizarin sulfonate.

The result proves that casein can be removed completely zirconium ions.

EXAMPLE 24

To 100 ml of 0.01% aqueous hemoglobin crystal (pH 5.13, COD 28.44 ppm) was added 10 ml of 0.1 N NaOH with mixing. Addition of 6 ml of 0.1 M $ZrOCl_2.8H_2O$ with thorough mixing resulted in rapid coagulation and precipitation to produce a colorless, transparent supernatant which was isolated by filtration.

The filtrate (pH 5.68, COD 2.27 ppm) was not detected zirconium ion in the test of alizarin sulfonate.

The result shows that hemoglobin can be removed completely by zirconium ions.

EXAMPLE 25

Addition of 6 ml of 0.005 M $ZrOCl_2.8H_2O$ to 100 ml of turbid waste water from aluminium polishing mill (pH 7.5, SS 432 ppm) with mixing resulted in rapid coagulation and precipitation to produce a colorless, transparent supernatant which was isolated by filtration.

Neither zirconium nor aluminium ions were detected in the filtrate (pH 7.3).

Therefore, the filtrate can be reused or discharged without other treatment.

EXAMPLE 26

To 100 ml of a suspension of 0.01% titanium dioxide ($TiO_2$) (pH 5.6, SS 100 ppm) was added 0.04 ml of 0.1 M $ZrOCl_2.8H_2O$ with mixing.

Addition of 0.07 ml of 0.1 N NaOH with thorough mixing resulted in rapid coagulation and precipitation to produce a colorless, transparent supernatant which was isolated by filtration.

Neither zirconium nor titanium dioxide were detected in the filtrate (pH 5.62).

The experiment was carried out to prove the complete removal of titanium dioxide contained in paper machine white liquor by the method of the present invention.

One cubic meter of the suspension requires, therefore, 12.88 g of $ZrOCl_2.8H_2O$ to obtain colorless, transparent filtrate.

EXAMPLE 27

To 100 ml of a suspension of 0.01% clay (pH 5.23, SS 100 ppm) was added 0.1 ml of 0.1 N NaOH with mixing.

Addition of 0.04 ml of 0.1 M $ZrOCl_2.8H_2O$ with thorough mixing resulted in rapid coagulation and precipitation to produce a colorless, transparent supernatant which was isolated by filtration.

The filtrate (pH 5.75) had SS (suspended substance) zero ppm and zirconium ion was not detected by alizarin sulfonate test.

EXAMPLE 28

To 100 ml of 0.01% aqueous dodecylbenzene sulfonate (C.P. reagent) (pH 5.7, COD 39.02 ppm) was added 3.4 ml of 0.1 N NaOH with mixing.

Addition of 2 ml of 0.1 M $ZrOCl_2.8H_2O$ with thorough mixing resulted in rapid precipitation and foam breaking to produce a colorless, transparent supernatant which was isolated by filtration.

The filtrate (pH 5.5, COD 1.89 ppm) was not detected zirconium ion in the test of alizarin sulfonate.

The results obtained are presented in following table:

| Sample ml | 0.1 N NaOH ml | 0.1 M $ZrOCl_2.8H_2O$ ml | Filtrate pH | COD ppm |
|---|---|---|---|---|
| 100 | 3.2 | 2 | 5.4 | 7.73 |
| 100 | 3.4 | 2 | 5.5 | 1.89 |
| 100 | 3.6 | 2 | 5.8 | 6.41 |

The result shows that the complete removal of dodecylbenzene sulfonate necessarily depends upon hydrogen ion concentration even though the quantity of zirconium salt is sufficient for complete removal thereof.

EXAMPLE 29

To 100 ml of 0.1% aqueous sodium alkylbenzene sulfonate, a commercial detergent (pH 9.4, COD 36.97 ppm), was added 1.0 ml of 0.1 N NaOH with mixing.

Addition of 2.0 ml of 0.1 M $ZrOCl_2.8H_2O$ with thorough mixing resulted in rapid precipitation to produce a colorless, transparent supernatant which was isolated by filtration.

The filtrate (pH 5.42, COD 5.87 ppm) was not detected zirconium ion in the test of alizarin sulfonate.

The result proves that the synthetic detergent, alkylbenzene sulfonate, can be removed completely by zirconium and that foam are completely broken as well.

EXAMPLE 30

To 100 ml of a turbid and foaming river water containing 0.2% of commercial sulfated alcohol detergent (pH 7.4, COD 38.0 ppm) was added 1.2 ml of 0.01 N HCl with mixing.

Addition of 20 ml of 0.005 M $ZrOCl_2.8H_2O$ with thorough mixing resulted in rapid precipitation to produce a colorless, not foaming supernatant which was isolated by filtration.

The filtrate (pH 5.55, COD 10.55 ppm) was not detected zirconium ion in the test of alizarin sulfonate.

The results are presented in following table:

| Sample ml | 0.005 M $ZrOCl_2.8H_2$ ml | 0.01 N NCl ml | Filtrate pH | Filtrate COD ppm |
|---|---|---|---|---|
| 100 | 20 | 1.4 | 5.20 | 20.10 |
| 100 | 20 | 1.2 | 5.55 | 10.55 |
| 100 | 20 | 1.0 | 5.80 | 18.51 |

EXAMPLE 31

Addition of 6 ml of 0.005 M $ZrOCl_2.8H_2O$ to 100 ml of river water (pH 6.8, COD 12.9 ppm) with mixing resulted in rapid precipitation to produce a colorless, transparent supernatant which was isolated by filtration.

The filtrate (pH 6.8, COD 10.8 ppm) was not detected zirconium ion in the test of alizarin sulfate.

EXAMPLE 32

To 500 ml of sewage (pH 7.1, COD 117.77 ppm) sampled May 23, 1974 at UKIMA sewage purification plant, Tokyo (composed of a mixture of industrial waste water from 730 mills including metal working, chemical, electroplating, food, chemical pulping and paper making plant as well as living sewage) was added lime milk to adjust the hydrogen ion concentration to pH 12.05 to coagulate and precipitate suspended substances and colloidal dispersed particles.

The filtrated solution was passed through carbon dioxide to remove excess calcium ions as insoluble calcium carbonate and filtered again (pH 7.43, COD 23.35 ppm)

The filtrate was added 18 ml of 0.1 N HCl with mixing. Addition of 5 ml of 0.1 M $ZrOCl_2.8H_2O$ resulted in rapid coagulation and precipitation to produce a colorless, transparent supernatant which was isolated by filtration. (pH 5.75, COD 20.91 ppm).

To 100 ml of the filtrate was added 6 ml of chlorine water (80.07 mg $Cl_2$/20 ml) and the resulted solution was irradiated for 30 minutes with ultra violet light as in example 1 to oxidize non-colloidal dissolved organic substances (pH 2.6, COD 12.59 ppm).

To 106 ml of the irradiated solution was added 10 ml of 0.1 N NaOH with mixing.

Addition of 1.0 ml of 0.1 M $ZrOCl_2.8H_2O$ resulted in rapid precipitation to produce a colorless, transparent supernatant which was isolated by filtration.

The filtrate (pH 5.5, COD 10.36 ppm) was not detected zirconium ion in the test of alizarin sulfonate.

EXAMPLE 33

One liter of mixed waste water composed of waste water from chlorination, hypochlorite, chlorine dioxide and alkali extraction stages of the bleaching process of kraft pulp (pH 3.0, COD 239.38 ppm), was mixed with 112 ml of 0.1 N NaOH.

Addition of 50 ml of 0.1 M $ZrOCl_2.8H_2O$ followed by thorough mixing resulted in rapid coagulation and precipitation to produce a colorless, transparent supernatant which was isolated by filtration.

The filtrate had pH 5.7 and COD 34.0 ppm.

To 100 ml of the filtrate was added 3.0 ml of chlorine water (80.07 mg $Cl_2$/20 ml), and the resulting solution was irradiated for 30 minutes with ultra violet light.

The irradiated filtrate had pH 2.8 and COD 25.58 ppm. The pH of the irradiated filtrate (103 ml) was adjusted with 8.0 ml of 0.1 N NaOH.

Addition of 3.0 ml of 0.1 M $ZrOCl_2.8H_2O$ with thorough mixing resulted in rapid coagulation and precipitation to form a colorless, transparent supernatant which was isolated by filtration.

The filtrate had pH 5.48 and COD 17.8 ppm.

EXAMPLE 34

To 100 ml of paper machine white liquor (pH 6.55, COD 48.93 ppm) was added 0.8 ml of 0.1 N NaOH with mixing.

Addition of 1.0 ml of 0.1 M $ZrOCl_2.8H_2O$ resulted in rapid coagulation and precipitation to produce a colorless, transparent supernatant which was isolated by filtration. (pH 6.17, COD 7.89 ppm).

To 100 ml of the filtrate was added 1 ml of chlorine water (71.85 mg $Cl_2$/20 ml) and irradiated for 30 minutes with ultra violet light (pH 3.1, COD 2.23 ppm).

As shown in the above paper machine white liquor is purified by zirconium oxychloride treatment followed by oxidation.

The following is claimed:

1. A process for the purification of surface water which comprises adding an aqueous solution of $ZrOCl_2.8H_2O$ to said surface water and adjusting the pH to 4.5–6.8 to coagulate and precipitate suspended substances and colloidal dispersed particles and precipitate non-colloidal dissolved, low molecular weight organic substances therein in the form of insoluble precipitates and chelates, and removing said precipitates and chelates.

2. The process according to claim 1 wherein the surface water is river water.

* * * * *